R. A. FESSENDEN.
WIRELESS DIRECTION FINDER.
APPLICATION FILED JULY 28, 1919.

1,374,293.

Patented Apr. 12, 1921.

WITNESS:

INVENTOR.

UNITED STATES PATENT OFFICE.

REGINALD A. FESSENDEN, OF CHESTNUT HILL, MASSACHUSETTS.

WIRELESS-DIRECTION-FINDER.

1,374,293. Specification of Letters Patent. Patented Apr. 12, 1921.

Application filed July 28, 1919. Serial No. 313,726.

*To all whom it may concern:*

Be it known that I, REGINALD A. FESSENDEN, of Chestnut Hill, in the county of Middlesex and State of Massachusetts, a citizen of the United States, have invented new and useful Improvements in Wireless Direction-Finders, of which the following is the specification.

My invention relates to means for determining direction by electro-magnetic waves, and more especially to that form of wireless direction finder invented by applicant and called the Fessenden pelorus, (sometimes called the wireless compass, but incorrectly, as the device is not a compass but a pelorus).

My invention has for its object increased efficiency in the operation of such direction finders, and more particularly increased efficiency of operation of the Fessenden pelorus, and still more particularly the overcoming of errors in estimating direction due to the bending of the electro-magnetic waves around conducting obstacles, or in the neighborhood of bodies of different conductivities.

Figure 1:
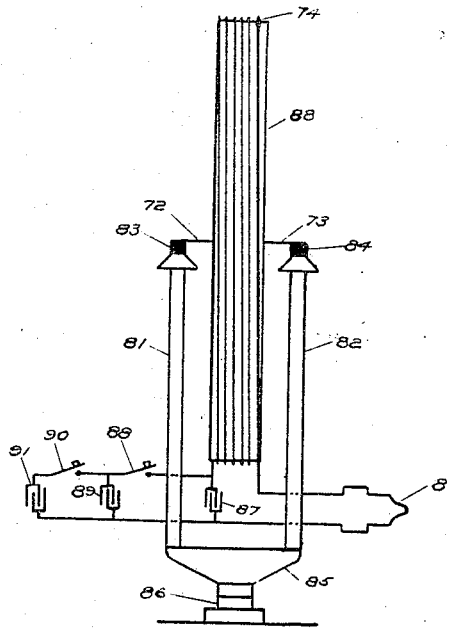
Figure 2:
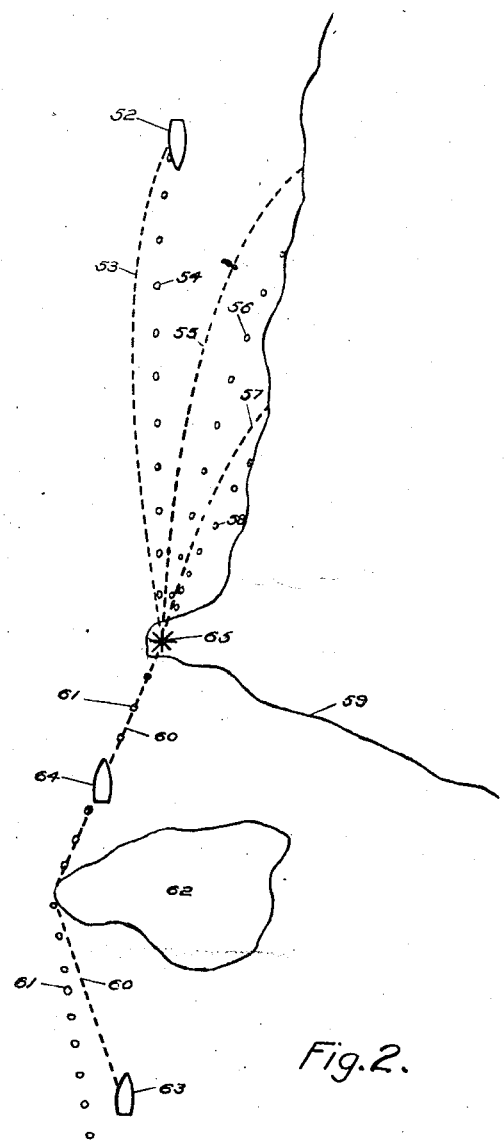

Figures 1 and 2 show, partly diagrammatically, apparatus suitable for carrying out my invention, and illustrating the method of its operation.

In the practice of wireless telegraphy it has been heretofore, and still is, generally the custom to utilize the electrostatic component of Hertzian waves by means of vertical antennæ, of the type first proposed by Dolbear, Edison, and Tesla.

Applicant in 1899 made the discovery that the electromagnetic component could be utilized by means of vertical coils of wire with or without magnetic cores, and published this discovery, ("*Electrical World*," August 12, 1899).

Several years later applicant discovered that these loops for utilizing the magnetic component were peculiarly well adapted for determining the direction of the source of received wireless signals, either by mounting the loops on a rotating stand as shown in U. S. application Serial No. 167,242, filed July 27, 1903; issued in part as U. S. Patent No. 1,020,032. Also German Patent 225,256, or by arranging a number of them radially and connecting them to a commutator, as shown in U. S. application No. 352,213, filed January 14, 1907, the corresponding French patent being No. 385,897, and the corresponding German Patent No. 225,256. Also U. S. application Serial No. 168,800, filed August 8, 1903, and issued as U. S. Patent No. 754,058. The modification subsequently made by Bellini and Tosi, (British patent specification No. 21,299 September 25, 1907), consisted in modifying applicant's loop method by substituting an inductive connection in place of applicant's original conductive connection.

Applicant termed this type of direction finder discovered by him, a pelorus, because it gives the direction of the source of electromagnetic waves relative to the lubber line of the ship, and has no relation whatever to the points of the compass.

The first experiments made with this type of apparatus in the years 1899–1901 were made over distances not exceeding twenty miles, and gave quite accurate results, and the apparatus was demonstrated and tendered to the U. S. Navy (letter to U. S. Bureau of Equipment, Navy Department, Washington, D. C., July 8, 1905; also London "*Electrician*," February 22, 1907), but though the Navy Department was interested, at the time there was no demand for apparatus of this character.

Later experiments, 1901–1906, made over distances exceeding one hundred miles, showed that the method frequently gave results in error by as much as twenty degrees from the true direction, and in later tests, 1906–1907, errors of as much as forty-five degrees were sometimes observed. As the result of numerous experiments, applicant discovered the causes of these erroneous readings and invented a new type of wireless direction finder.

The cause was found to be the existence of regions more or less opaque to the travel of the electromagnetic waves, thereby causing the production of shadows, and the bending of the direction of travel of the electromagnetic waves around the edges of the opaque regions.

Over land these opaque regions were found to be due to—

*a.* Varying local conductivity of the ground.

Certain sections of the land surface appear to form insulated pockets. Such a pocket exists for example just outside of the city of Pittsfield, where the street railway could not operate its system in 1891 until Mr. C. C. Chesney discovered the trouble to be due to the extremely high resistance of the ground return. This pocket appears to be formed of insulating rock strata which come to the surface and form a sort of insulating bowl, filled with conducting soil, this conducting soil, however, being insulated from the exterior country by the edges of the insulating bowl.

A similar insulating bowl was described by Dr. Kennelly in the London "*Electrician*," at one of the cable landings in the Canadian Maritime Provinces.

*b.* Varying local and temporal absorption due to vegetation.

As pointed out by applicant in 1903, every tree acts as an antenna, and absorbs energy, and the amount of energy absorbed depends on the amount of sap in the trees ("*Electrical World and Engineer*," November 14, 1903.)

Over water and parallel to a coast line, such as that between Cape Henry and Cape Hatteras, the error in direction was found to be due to—

*c.* The great difference between the resistance of the water and that of the sandy beach, causing the electromagnetic waves to bend in.

Over the sea, and also over the land, directional errors were also found to be due to the presence of the large bodies of ionized air, discovered by applicant through his transatlantic experiments to exist in the upper regions of the atmosphere, and described by him in the "*Electrical Review*," March 11-18, 1906.

The new type of direction finder (U. S. application Serial No. 356,814, filed Feb. 11, 1907, corresponding British Patent No. 2955/1908) was based on the application of horizontal electromagnetic waves instead of vertical waves, and was found to give in practice considerably more accurate results up to the limit of its range. Its range was, however, shorter than that of the original Fessenden pelorus, using vertical waves.

Applicant's present invention is a modification and an improvement of the original vertical wave Fessenden pelorus, and is based upon applicant's discovery that the amount of the bending, *i. e.*, the amount of directional error, is a function of the wave length of the electromagnetic waves used for direction finding. In applicant's new method, instead of a single frequency of electromagnetic waves, two, and preferably three, frequencies are used, and by means of the readings obtained with these different frequencies of transmission the existence of an error is detected and its amount may be estimated with a fair degree of accuracy.

Fig. 2 illustrates the use of the method.

Here 65 is a wireless station arranged to emit signals of a plurality of frequencies, for example, 200,000 per second and 100,000 per second. 52 is a vessel equipped with a Fessenden pelorus of the type shown in Fig. 1.

Owing to the fact that the waves traveling from the station 65 to the vessel 52 move parallel with the coast, their path of travel is inclined as mentioned previously in the specification, and the dotted lines 53—55—57 may be taken to represent the paths of travel of the waves having a frequency of 200,000 per second, and the lines of small circles 54, 56, 58, the paths of the waves of frequency of 100,000 per second.

The observer on the vessel 52 observes the direction as given by pelorus, with the pelorus arranged to receive waves of 200,000 frequency.

He then takes a second reading with the pelorus arranged to receive waves of 100,000 frequency.

If both these readings give the same direction, the observer knows that there has been no bending of the paths of either of the two frequencies of electromagnetic waves, and that the direction is a true one.

If, however, there is a difference in the readings for the two frequencies he knows that the path of the waves has been bent and by certain formulæ which do not form a part of this invention and are therefore not herein given, or still more simply, by empirically observing what differences in the directional reading for the two frequencies correspond to a given angle of bending, he can determine the true direction.

While the use of two frequencies is shown it is preferred to use also a third frequency, the arrangement for receiving which is shown in Fig. 1, because by using three frequencies comparisons may be made between three pairs of frequencies, and the results obtained with each pair may be used as a check on the results obtained with the other pairs.

Fig. 2 also shows, in its lower section, the effect of a large cloud of ionized air 62. Here the vessel 64 will obtain the same directional reading on both frequencies, because the path shown by the dotted line 60 of the waves of frequency 200,000 will be the same as the path (shown by the line of circles 61) of the waves of frequency 100,000.

But the vessel 63, lying in the shadow of the mass of ionized air 62, will receive the waves after they have been bent by passing around the edge of 62, and as the amount of bending, as applicant has discovered from his experiments, varies with the wave length, the paths of 60 and 61 will diverge after passing around the edge of 62, and the readings obtained with the pelorus on the vessel 63 will be different for the different frequencies as to direction; and will also differ in intensity, which latter phenomenon may also be made use of as a check.

Apparatus suitable for carrying out the invention is shown in Fig. 1, where 88 is a large disk formed of wood or papier mâché on which is wound the magnetic component receiving coil 74, as described in U. S. application Serial No. 167,242, filed July 27, 1903, and U. S. Patent No. 754,058, filed August 8, 1903, and German Patent No. 225,256, filed January 8, 1907.

72, 73, are wire supports for the spool 88, and 83, 84 are insulators to which 72, 73 are attached as shown, and 81, 82, are supports of the revolving turn table 85, 86 being the fixed base.

8 is a receiver of any suitable type, and 87, 89, 91 are tuning capacities whereby the coil 74 may be tuned to any one of three desired frequencies by leaving both of the keys 88, 90 open, or closing the key 88, or closing both 88 and 90.

It will be obvious that the use of applicant's pelorus without means for discovering and estimating the errors due to bending will, in a considerable percentage of cases, result in large errors in navigation. As an illustration, it is understood that on one occasion during the late war, a number of German zeppelins which had located their course by readings from the German wireless stations, and had steered accordingly, found themselves several hundred miles out of their calculated position, and over French territory.

By means of the apparatus and methods described above, which were disclosed to the U. S. Army and Navy Departments in December, 1914, but have been kept secret until now, these difficulties are largely overcome.

What I claim is—

In the art of direction finding, the method of determining the direction of a source of radiant energy from an observing station, which consists in taking a plurality of observations at the observing station, at different wave frequencies of the energy emitted from the radiant station, of the direction of the waves received from said radiant station, and from the amount of the discrepancy between said observations, determining the amount of bending, of said waves and the true direction of the radiant station.

REGINALD A. FESSENDEN.